United States Patent
Nishi et al.

(10) Patent No.: US 8,156,315 B2
(45) Date of Patent: Apr. 10, 2012

(54) INFORMATION PROCESSING APPARATUS AND OPERATION METHOD OF THE SAME

(75) Inventors: Naoshi Nishi, Matsuda (JP); Tatsuo Namba, Fujisawa (JP); Masanobu Ikeda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/306,312

(22) PCT Filed: Dec. 15, 2008

(86) PCT No.: PCT/JP2008/003768
§ 371 (c)(1),
(2), (4) Date: Dec. 23, 2008

(87) PCT Pub. No.: WO2010/070700
PCT Pub. Date: Jun. 24, 2010

(65) Prior Publication Data
US 2011/0321177 A1    Dec. 29, 2011

(51) Int. Cl.
*H04L 29/06* (2006.01)
*G06F 11/00* (2006.01)

(52) U.S. Cl. ............ 713/1; 713/156; 713/157; 717/121; 717/124; 702/186

(58) Field of Classification Search ...... 713/1, 156–157; 717/121, 124; 702/186
See application file for complete search history.

(56) References Cited

U.S. PATENT DOCUMENTS

| | | | | |
|---|---|---|---|---|
| 7,234,061 B1 * | 6/2007 | Diab et al. | ................... | 713/176 |
| 7,711,952 B2 * | 5/2010 | Teal et al. | ................... | 713/156 |
| 7,818,574 B2 * | 10/2010 | Fayad et al. | ................... | 713/175 |
| 7,845,016 B2 * | 11/2010 | Diab et al. | ................... | 726/34 |
| 7,913,081 B2 * | 3/2011 | Li et al. | ................... | 713/157 |
| 2003/0237017 A1 | 12/2003 | Jibbe | | |
| 2007/0226487 A1 * | 9/2007 | Li | ................... | 713/156 |
| 2008/0052433 A1 | 2/2008 | Harima et al. | | |

FOREIGN PATENT DOCUMENTS

| | | |
|---|---|---|
| EP | 1117043 A1 | 7/2001 |
| EP | 0952521 B1 | 10/2003 |
| EP | 1674982 A1 | 6/2006 |
| EP | 1691276 A2 | 8/2006 |
| JP | 2006178720 | 7/2006 |

* cited by examiner

*Primary Examiner* — M Elamin
(74) *Attorney, Agent, or Firm* — Brundidge & Stanger, P.C.

(57) ABSTRACT

Provided is a service processor (SVP) 10 that validates a configuration of a storage system 1 having a server device 30, a storage device 20 providing the server device with a storage area, and a FC switch 40 coupling the storage device 20 and the server device 30. The SVP 10 includes a configuration information storing part 11 which acquires predetermined constituent element information from the storage device 1 and stores the predetermined constituent element information on a configuration management table 200; a configuration change detecting part 12 which compares constituent element information stored in the configuration management table 200 and the acquired constituent element information, and determines whether there is a change in a constituent element, and if there is a change, determines whether, in a vendor certification information database 50, there is a constituent element after changing which has received certification; a vendor certification test conducting part 13 which conducts a vendor certification test targeted for a storage system 1, if there is no constituent element having received certification; and a data storing part 14 which stores a result of the vendor certification test in a constituent element determination table 400 of the storage system 1.

10 Claims, 9 Drawing Sheets

CONSTITUENT ELEMENT DETERMINATION TABLE 400

| CONSTITUENT ELEMENT | CONTENT | DETERMINATION RESULT |
|---|---|---|
| SERVER MODEL NUMBER | SV-1 | ○ |
| SERVER OS TYPE/VERSION | OS-1v1.0 | ○ |
| HBA MODEL NUMBER | HBA-1 | ○ |
| HBA DRIVER VERSION | HBADrv-1 | ○ |
| SWITCH MODEL NUMBER | SW-1 | ○ |
| SWITCH FIRMWARE VERSION | SWFw-1 | × |
| STORAGE MODEL NUMBER | STR-1 | ○ |
| STORAGE MICROPROGRAM VERSION | STPgm-1 | ○ |

CONFIGURATION ID: 1  DETERMINATION △

TEST-NOT-NECESSARY FLAG: 0

VENDOR CERTIFICATION TEST ITEM TABLE 600

| EXAMPLE OF PROGRAM EXECUTION CONTENTS | AT TIME OF OS CHANGE | AT TIME OF HBA DRIVER CHANGE | AT TIME OF SW FIRMWARE CHANGE | AT TIME OF STORAGE CHANGE |
|---|---|---|---|---|
| I/O HEAT RUN AT STATIONARY TIME (12 HOURS OR MORE) | NECESSARY | NECESSARY | NECESSARY | NECESSARY |
| DATA VERIFY AFTER I/O HEAT RUN | NECESSARY | NECESSARY | NECESSARY | NECESSARY |
| MAINTENANCE/FAILURE TEST (CABLE PULL-OUT: 5 TIMES FOR EACH CABLE) | NECESSARY | NECESSARY | — | NECESSARY |
| MAINTENANCE/FAILURE TEST (HBA PORT CLOSURE: 10 TIMES IN TOTAL) | NECESSARY | NECESSARY | — | NECESSARY |
| MAINTENANCE/FAILURE TEST (HBA DRIVER SWITCH: 5 TIMES IN TOTAL) | NECESSARY | — | NECESSARY | NECESSARY |
| MAINTENANCE/FAILURE TEST (SW CABLE UNCOUPLING → CABLE REINSERTION 10 TIMES IN TOTAL) | NECESSARY | — | NECESSARY | NECESSARY |
| MAINTENANCE/FAILURE TEST (SW PORT CLOSURE → RESTART: 5 TIMES FOR EACH PORT) | NECESSARY | — | NECESSARY | NECESSARY |
| MAINTENANCE/FAILURE TEST (SW FIRMWARE SWITCH: 5 TIMES IN TOTAL) | NECESSARY | NECESSARY | NECESSARY | NECESSARY |
| MAINTENANCE/FAILURE TEST (STORAGE REBOOT: 5 TIMES IN TOTAL) | NECESSARY | NECESSARY | NECESSARY | NECESSARY |
| MAINTENANCE/FAILURE TEST (SERVER REBOOT: 5 TIMES IN TOTAL) | NECESSARY | NECESSARY | NECESSARY | NECESSARY |

INFORMATION PROCESSING APPARATUS AND OPERATION METHOD OF THE SAME

TECHNICAL FIELD

The present invention relates to an information processing apparatus and an operation method thereof, and more particularly to an information processing apparatus and an operation method thereof that are capable of detecting a change in the configuration of a storage system and thereby conducting a quick vendor certification test for the changed configuration.

BACKGROUND ART

When a storage system manufacturer delivers a storage system to a user, the entire storage system, besides certification of constituent elements constituting the storage system, undergoes vendor certification by a vendor supplying software (e.g., OS (Operating System)) which operates, upon request of the user, on a server using the storage system, in some cases.

The above vendor certification is issued when the storage system undergoes a vendor certification test using a vendor certification test program provided by the vendor, and consequently, all the test items are normally completed. With this certification, the vendor assures the user that the storage system can be properly used by the server in which the software of the vendor is installed.

When part of the constituent elements of the storage system is changed after the storage system with the vendor certification given by the vendor is delivered to the user, the changed configuration of the storage system sometimes results in different one from that given with the vendor certification by the vendor. In such a case, a vendor certification test needs to be conducted for the storage system after the configuration change again.

Patent Citation 1 discloses a conventional technique for centrally managing the configuration changes of such a storage system thereby obtaining the latest configuration to reduce occurrences of a failure due to a configuration change.

However, when the storage system results in the one having a configuration to which vendor certification is not given, due to a configuration change of the storage system, the manufacturer is required to build the same storage system as that after the configuration change and to acquire a vendor certification. Such being the case, there are problems that it is difficult for the user to quickly obtain a vendor certification after a configuration change, and that the manufacturer is required to spend time and cost to reproduce the storage system of the user to newly obtain a vendor certification.

Patent Citation 1: Japanese Patent Application Laid-open Publication No. 2006-178720

DISCLOSURE OF INVENTION

An object of the present invention is to provide an information processing apparatus and an operation method thereof that are capable of detecting a change in the configuration of a storage system and thereby conducting a quick vendor certification test for the changed configuration.

An aspect of the present invention to solve the above and other problems is an information processing apparatus validating a configuration of a storage system having a server device, a storage device providing the server device with a storage area, and a relay device coupling the storage device and the server device. The information processing apparatus includes a configuration information storing part for acquiring and storing constituent element information pieces from the server device, the storage device, and the relay device, the constituent element information pieces each being information on a constituent element that is set a test target of a vendor certification test being a test to be conducted in order to receive certification for the storage device from a vendor of software installed in the server device; a configuration change detecting part for comparing the stored constituent element information pieces that are stored in the configuration information storing part with the constituent element information piece that is acquired from the storage system by the configuration information storing part, so as to determine whether there is a change in the acquired constituent element information piece, and, if determining that there is a change in the acquired constituent element information piece, the configuration change detecting part comparing the acquired constituent element information piece determined as being changed with certified constituent element information pieces that are stored in a storing device coupled to the information processing apparatus and having received the vendor certification, so as to determine whether the storing device includes any certified constituent element information piece which matches the acquired constituent element information piece determined as being changed; a vendor certification test conducting part for conducting the vendor certification test targeted for the storage system having the acquired constituent element information piece determined as being changed, if the configuration change detecting part determines that no matching constituent element information piece is included; and a data storing part for storing, in the storing device, a result of the vendor certification test conducted by the vendor certification test conducting part.

The object disclosed in this application and solving means for the object become fully apparent with reference to the following section of best mode for carrying out the invention, and the accompanying drawings.

The present invention enables detection of a change on the configuration of a storage system and a quick vendor certification test for the changed configuration.

DESCRIPTION OF EMBODIMENTS

An embodiment of the present invention will be described with reference to the drawings.

Figure 1A:
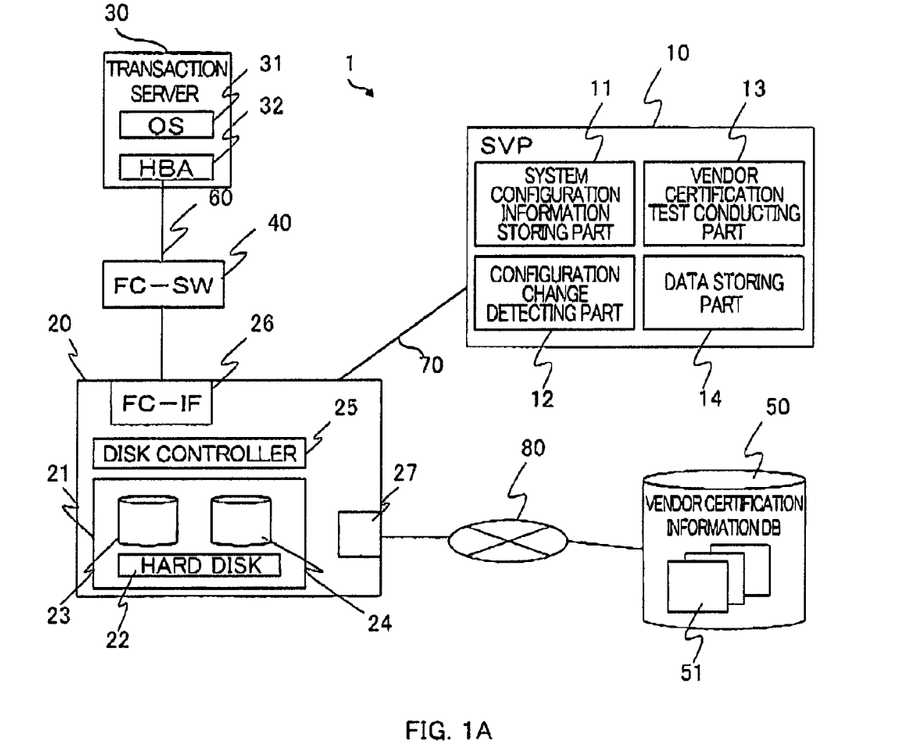
FIG. 1A is a diagram showing a configuration of a storage device 1.

In FIG. 1A, shown is a configuration of a storage system 1 to be described as an embodiment of the present invention. As shown in FIG. 1A, the storage system 1 includes a service processor (hereinafter referred to as "SVP") 10 as an information processing apparatus, a storage apparatus 20, a transaction server 30, a Fiber Channel (hereinafter, referred to as "FC"), switch 40 (relay device), and a vendor certification information database 50.

The transaction server 30 is coupled to the storage apparatus 20 via a FC network 60 including the FC switch 40 so as to be capable of communicating.

The SVP 10 is coupled to the storage apparatus 20 by a communication line 70. Incidentally, as described below, the SVP 10 may be integrated into the storage apparatus 20, and in that case, the communication line 70 works as an internal communication network in the storage apparatus 20.

The storage apparatus 20 is coupled to the vendor certification information database 50 by a communication network 80.

The transaction server 30 is, for example, a computer such as a personal computer or a workstation, and performs a data process using various types of application software. In the transaction server 30, a server OS 31 operates on hardware to be described in connection with FIG. 1B.

The server OS 31 is provided, by the storage apparatus 20, with data to be processed using application software. The server OS 31 stores the data into or reads the data from a storage area allocated to the application software. The term, "vendor certification" in this specification is equal to vendor certification of an OS vendor which is provided by the server OS 31 operating on the transaction server 30.

The transaction server 30 includes an HBA (Host Bus Adapter) 32. The HBA 32 is a processor which controls data input/output between a memory of the transaction server 30 and the FC network 60 by performing device driver software.

In SAN (Storage Area Network) enabling communication in FC protocol between the storage apparatus 20 and the transaction server 30, the FC switch 40 is a fabric switch which couples application software operating on the transaction server 30 and an area of the storage apparatus 20 allocated to the application software, and includes a processor performing specific firmware for achieving switch functions.

In an example of FIG. 1A, a single storage apparatus 20 is coupled to a single transaction server 30 via the FC switch 40, but a plurality of transaction servers 30 and a plurality of storage apparatuses 20 may be coupled via the FC switch 40.

The storage apparatus 20 provides a storage area which is allocated to application software operating on the transaction server 30. The storage apparatus 20 includes a disk device 21, a disk controller 25, a cache memory (not shown), an FC interface 26 and a communication port 27.

The disk device 21 includes a hard disk 22 as a physical disk. The disk device 21 may be a disk array which is configured by integrating a plurality of disk drives based on, for example, RAID (Redundant Array of Inexpensive Disks) method. In addition, storage medium other than a hard disk drive, such as a semiconductor memory, may be adopted.

In a physical storage area provided by this hard disk 22, two storage areas, one being a data storage area 23 which is a logical storage area, and the other being a vendor certification information storage area 24, are formed. The data storage area 23 is allocated to application software of the transaction server 30 and functions as a storage area for data of the application software. The vendor certification information storage area 24 stores therein programs, data tables, and the like corresponding to a vendor certification test of this embodiment.

The disk controller 25 manages, for example, the hard disk 22 with a predetermined RAID configuration, and writes data into or reads data from the cache memory, and writes data into or reads data from the hard disk 22. The FC interface 26 makes communication with the FC network 60.

The communication port 27 is coupled to a communication network 80 which couples the storage apparatus 20 to the vendor certification information database 50. The communication network 80 is, for example, the Internet.

The SVP 10 is a computer monitoring the operation state of the storage apparatus 20, and is capable of performing, on the storage apparatus 20, an operation such as the acquiring of operation information of each element, externally.

As described above, the SVP 10 does not need to be provided separately from the storage apparatus 20 as shown in FIG. 1A, and may be integrated into the storage apparatus 20.

The SVP 10 of this embodiment includes a system configuration information storing part 11, a configuration change detecting part 12, a vendor certification test conducting part 13, and a data storing part 14. Further, in addition to these parts, the SVP 10 includes other function part, as needed, which achieves a function for monitoring the management of the operation state of the storage apparatus 20 or for performing function similar thereto.

Figure 2:
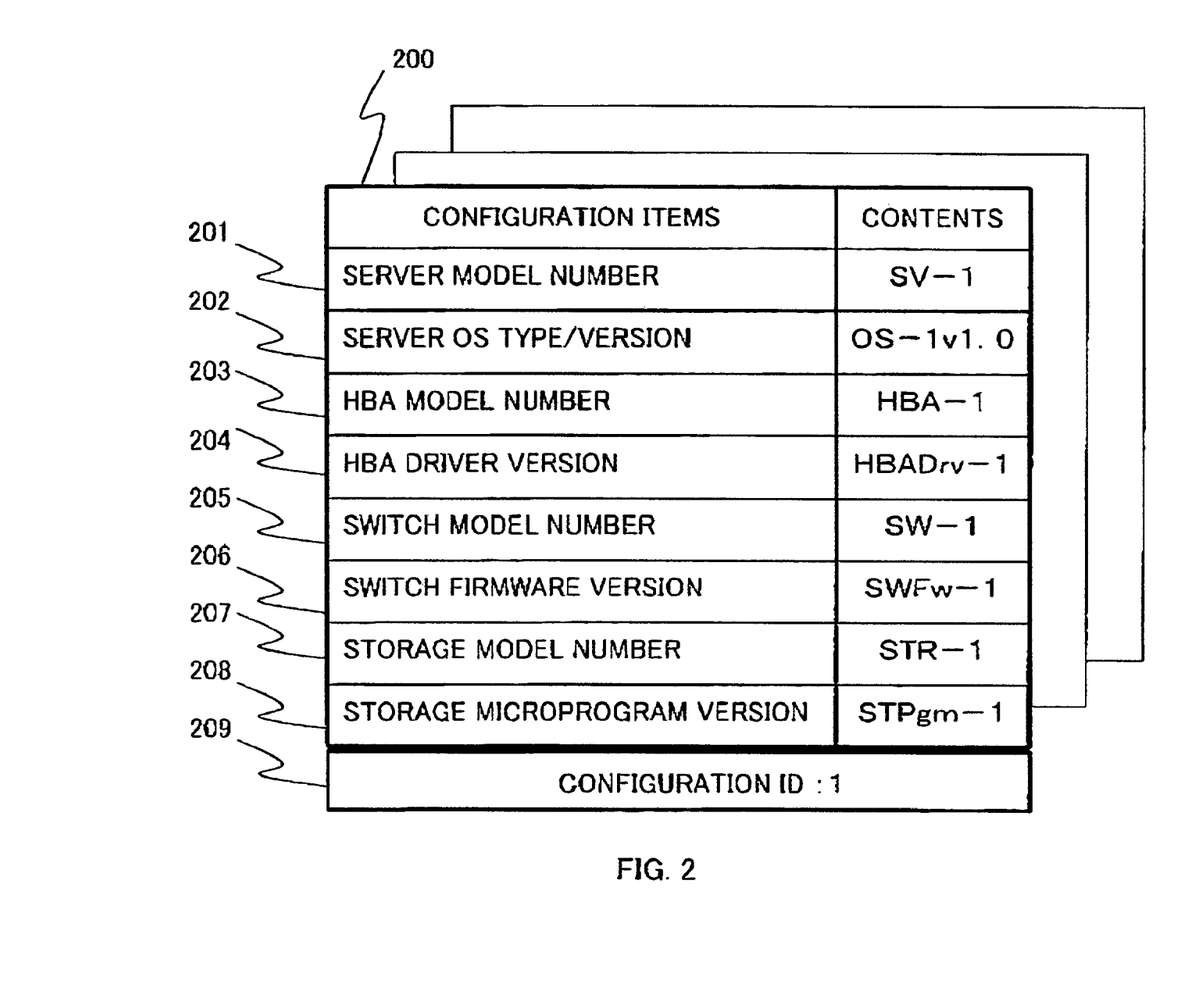
FIG. 2 is an example of a configuration management table 200.

The system configuration information storing part 11 acquires a predetermined type of information on predetermined constituent elements of a configuration including combination of the storage apparatus 20, the FC switch 40, and the transaction server 30. Then, the system configuration information storing part 11 records the acquired information on a configuration management table 200 to be described below. The configuration change detecting part 12 compares, as appropriate, pieces of information on the constituent elements acquired by the system configuration information storing part 11, and determines whether any change is made to the constituent elements.

When the configuration change detecting part 12 determines that a vendor certification test needs to be conducted for the configuration of the storage system 1 based on the determination result, the vendor certification test conducting part 13 conducts a vendor certification test according to a certain condition.

The data storing part 14 stores a conducting result of the vendor certification test of the storage system 1 into the vendor certification information database 50.

Processes to be achieved by these function parts are described below with reference to examples of process flows.

The vendor certification information database 50 is a database which records and holds, on a constituent element determination table 51, the conducting results of the vendor certification tests on each storage system 1, the conducting result being transmitted from the data storing part 14 of the SVP 10 via the communication network 80. The constituent element determination table 51 is described below.

The vendor certification information database 50 is placed at, for example, a data center or the like operated by a manufacturer of the storage system 1. To the vendor certification information database 50, a plurality of storage systems 1 owned by different users may be coupled via the communication network 80. In this case, the constituent element determination table 51 is held for each of the storage systems 1 coupled to the vendor certification information database 50.

Figure 1B:
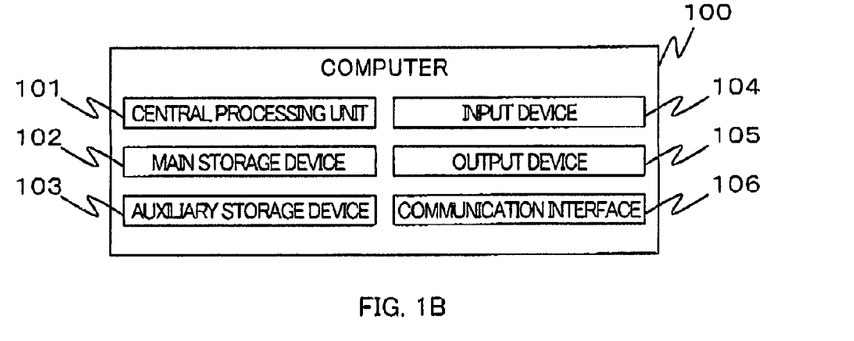
FIG. 1B is a diagram showing an example of a hardware configuration of a computer which is usable as a service processor 10 and a transaction server 30.

In FIG. 1B, an example of a computer which is usable as the SVP 10 or the transaction server 30 is shown. This computer 100 includes a central processing unit 101 (e.g., a CPU (Central Processing Unit) or an MPU (Micro Processing Unit)), a main storage device 102 (e.g., a RAM (Random Access Memory) or a ROM (Read Only Memory)), an auxiliary storage device 103 (e.g. a hard disk), an input device 104 (e.g., a keyboard or a mouse) receiving operation input from a user, an output device 105 (e.g., a liquid crystal monitor), and a communication interface 106 (e.g., NIC (Network Interface Card) or HBA) achieving communication with other devices.

Incidentally, the vendor certification information database 50 is also operated by, for example, a server computer having a configuration of FIG. 1B, basically.

Functions of the system configuration information storing part 11, the configuration change detecting part 12, the vendor certification test conducting part 13, and the data storing part 14 included in the SVP 10 are each achieved in such a way that, for example, the central processing unit 101 reads out, to the main storage device 102, a program corresponding to the function thereof stored in the vendor certification information storage area 24 of the storage apparatus 20, and executes the program.

Next, a configuration management table 200 generated and referred in the embodiment is described. FIG. 2 is an example of the configuration management table 200.

The configuration management table 200 is generated based on information acquired from the storage system 1 by the system configuration information storing part 11 of the SVP 10, and is stored into the vendor certification information storage area 24 of the storage apparatus 20.

On the configuration management table 200, the following are recorded: items of constituent elements which are selected in advance by a manufacturer or the like so that the configuration of the storage system 1 being a target of the vendor certification test is suitably represented; and pieces of information, on each of the items, which are acquired from the storage system 1 by the system configuration information storing part 11. The items to be recorded in this embodiment are as follows.

Server model number indicated by 201 is the model number ("SV-1" in the example of FIG. 2) of a server computer being used as the transaction server 30 in the storage system 1.

Server OS type/version 202 is the type and the version of a server OS ("OS-1v1.0" in the example of FIG. 2) operating on the transaction server 30. For the type of the server OS, for example, a product name, an abbreviated name, or the like of the server OS may be recorded.

HBA model number 203 is the model number ("HBA-1" in the example of FIG. 2) of an HBA 32 included in the transaction server 30. Alternatively, for example, a unique WWN (World Wide Name) given to each HBA 32 may be used instead of the model number of the HBA 32.

HBA driver version 204 is the version ("HBADrv-1" in the example of FIG. 2) of driver software operating on the HBA 32.

Switch Model Number 205 is the model number ("SW-1" in the example of FIG. 2) of the FC switch 40 coupling the transaction server 30 and the storage apparatus 20.

Switch firmware version 206 is the version ("SWFw-1" in the example of FIG. 2) of firmware operating on the FC switch 40.

Storage model number 207 is a model number ("STR-1" in the example of FIG. 2) given to the storage apparatus 20 by the manufacturer.

Storage microprogram version 208 represents the version ("STPgm-1" in the example of FIG. 2) of a microprogram to be executed by the central processing unit 101 of the SVP 10.

On each of the configuration management table 200, configuration ID 209 is recorded as an identification symbol for identifying the configuration of the storage system 1 recorded on the configuration management table 200. In the example of FIG. 2, configuration ID 209 is "1," but other symbol such as a model number given by the manufacturer may be recorded as configuration ID 209.

The system configuration information storing part 11 of the SVP 10 acquires the above information from the storage system 1 at predetermined time intervals, and records the acquired information on the configuration management table 200.

Next, processes of this embodiment to be performed by the system configuration information storing part 11, the configuration change detecting part 12, the vendor certification test conducting part 13, and the data storing part 14 of the SVP 10 are described below with reference to a process flow.

—Main Process of Configuration Change Detection/Conducting of Vendor Certification Test—

Figure 3:
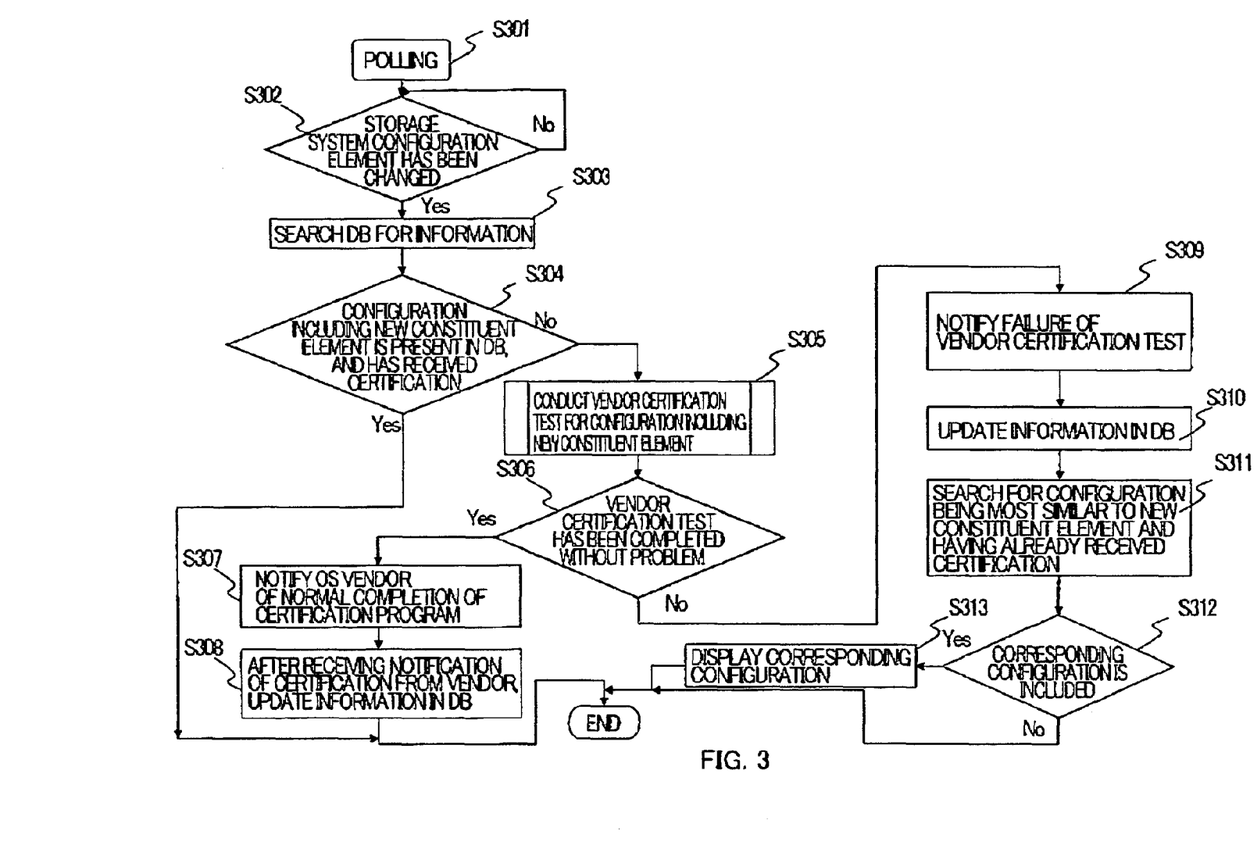
FIG. 3 is an example of a conducting process flow of a configuration change detection and a vendor certification test.

In FIG. 3, shown is a main process flow of configuration change detection of the storage system 1 by the SVP 10, and of the conducting of a vendor certification test based on the detection. Incidentally, a reference symbol S stands for "Step."

First, the system configuration information storing part 11 performs polling on the storage system 1 at each predetermined time interval, and acquires predetermined information on constituent elements from the storage system 1, and records the acquired information on the configuration management table 200 (S301). Here, the predetermined information means the information recorded on the configuration management table 200 of FIG. 2.

At the first start of this embodiment, the configuration management table 200 is not yet generated. Accordingly, a configuration management table 200 on the storage system 1 being a polling target is generated based on acquired information of constituent elements.

Next, the configuration change detecting part 12 compares each of pieces of information on the constituent elements acquired by the system configuration information storing part 11, and each of pieces of information recorded on the configuration management table 200 (S302). When determining that any one of the constituent elements is changed, the configuration change detecting part 12 searches for a constituent element determination table 400 stored in the vendor certification information database 50 (S303), and determines whether there is a constituent element determination table 400 having constituent elements which respectively agree with the constituent elements after the configuration change. When determining that there is, the configuration change detecting part 12 determines (S304) whether the constituent element determination table 400 has received vendor certification.

When it is determined that there is a constituent element determination table 400 recording a configuration which agrees with the configuration of constituent elements after the configuration change and which has received vendor certification (Yes in S304), the process flow of FIG. 3 is terminated. This is because it has been confirmed that the configuration including constituent elements which agree with the constituent elements after the configuration change of the storage system 1 being a polling target has already received vendor certification.

Figure 4:
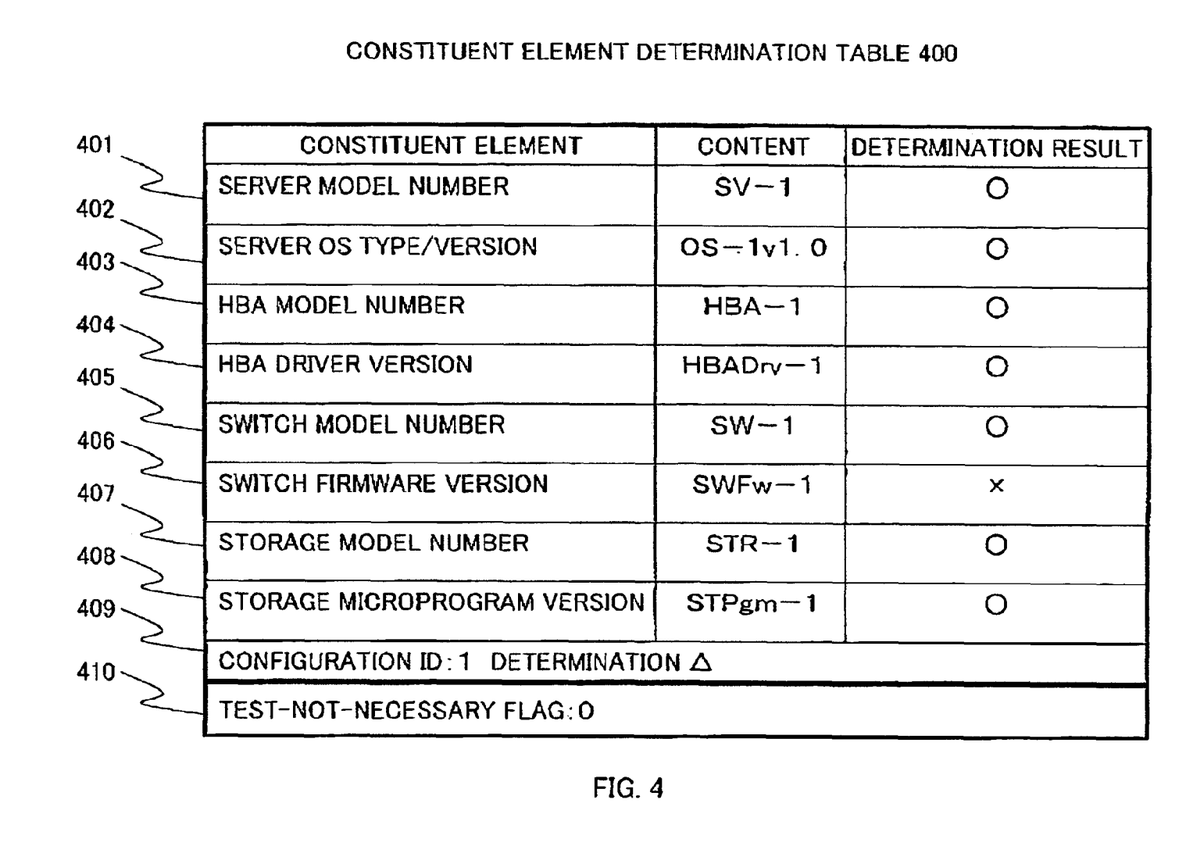
FIG. 4 is an example of a constituent element determination table 400.

The constituent element determination table 400 is described below. The constituent element determination table 400 is stored in the vendor certification information database 50. FIG. 4 illustrates an example of the constituent element determination table 400.

The constituent element determination table 400 has the same items as those recorded on the configuration management table 200 shown in FIG. 2. These items are server model number 401, server OS type/version 402, HBA model number 403, HBA driver version 404, switch model number 405, switch firmware version 406, storage model number 407, storage microprogram version 408, and configuration ID 409, and being recorded in the data storing part 14 of the SVP 10 described later.

In addition to the items recorded on the configuration management table 200, a determination result obtained as a result of conducting a vendor certification test for each constituent element (in FIG. 4, a symbol of "circle" is recorded when the vendor certification test is normally completed, and a symbol of "cross" is recorded when the vendor certification test fails. In addition, for a test item which has not been conducted since involving suspension of transaction, for example, a symbol of "triangle" is recorded, as described below in connection with a process flow of FIG. 7), and whether the configuration of the storage system 1 recorded on the constituent element determination table 400 has received vendor certification as a whole are recorded on the constituent element determination table 400.

Whether the configuration of the storage system 1 has received vendor certification as a whole is indicated by "circle", "cross" or "triangle", along with the configuration ID 409. When the vendor certification test is normally completed for all the constituent elements, "circle" is indicated. When the vendor certification test fails for all the constituent elements, "cross" is indicated. When the vendor certification test fails for part of the constituent elements, "triangle" is indicated. In the example of FIG. 4, only the vendor certification test for switch firmware version 406 has failed, so that "triangle" is indicated.

Further, on the constituent element determination table 400, a test-not-necessary flag 410 is recorded by the vendor certification test conducting part 13 in the SVP 10, the flag indicating that there is no need to conduct the vendor certification test for a storage system 1 corresponding to the present constituent element determination table 400.

In this embodiment, 1 or 0 is recorded on the test-not-necessary flag 410; if 1 is recorded on the test-not-necessary flag 410, the vendor certification test conducting part 13 determines that there is no need for conducting the vendor certification test for the storage system 1 corresponding to the constituent element determination table 400. As described below, this test-not-necessary flag 410 is used in a process for preventing the vendor certification test from being repeatedly conducted for a plurality of storage systems 1 having the same configurations as one another.

Returning to the process flow of FIG. 3, if it is determined that there is no constituent element determination table 400 recording a configuration which agrees with the configuration of constituent elements after the configuration change and which has received vendor certification (No in S304), the vendor certification test conducting part 13 of the SVP 10 conducts the vendor certification test for the configuration after the configuration change in accordance with a predetermined condition (S305).

More specifically, the vendor certification test conducting part 13 gives a notice to the server OS 31 of the transaction server 30 to execute a vendor certification test program stored in the vendor certification information storage area 24 of the storage apparatus 20. When receiving this notice, the server OS 31 of the transaction server 30 executes the vendor certification test program. The conducting process of the vendor certification test of S305 is described in detail below.

The vendor certification test conducting part 13 determines whether the vendor certification tests have normally been completed for all the constituent elements (S306). When it is determined that the vendor certification test has normally been completed for all the constituent elements (Yes in S306), the vendor certification test conducting part 13 gives, to the OS vendor, a notice indicating that the vendor certification test on the configuration after the change has normally been conducted (S307). This notice is achieved, for example, with a configuration in which an e-mail generated by the vendor certification test conducting part 13 is transmitted to a predetermined sever computer of the OS vendor via the communication network 80 such as the Internet.

After the vendor certification test conducting part 13 receives a notice indicating that vendor certification has been given from the OS vendor, the vendor certification test conducting part 13 causes the data storing part 14 to store (S308), in the vendor certification information database 50, a constituent element determination table 400 on the configuration after the change.

Meanwhile, in S306, if it is determined that the vendor certification test has failed for any one of the constituent elements (No in S306), the vendor certification test conducting part 13 gives, to the user of the storage system 1, a notice indicating that the vendor certification test on the configuration after the configuration change has not normally been completed (S309).

To be more specific, for example, a screen including information indicating that the vendor certification test has not normally been completed is displayed on a display screen of the output device 105 of the transaction server 30. This screen may also be displayed on a display screen of a management console generally provided to the storage apparatus 20.

Next, the data storing part 14 of the SVP 10 records, on a field of configuration ID 409, a result ("triangle" or "cross" in the example of FIG. 4) of the vendor certification test conducted this time on the constituent element determination table 400 storing the configuration after the change, and updates the result (S310).

Next, the vendor certification test conducting part 13 searches the vendor certification information database 50 to find out whether there is a constituent element determination table 400 recording a configuration which is most similar to a configuration after update, and which has received vendor certification. (S311)

A similarity determination of the configuration of the storage system 1 is performed, for example, as follows. In the vendor certification information database 50, a set of constituent elements (e.g., a set of a plurality of switch model numbers 405 which are substitutable) being substitutable for one another are recorded in advance.

Among each of the constituent elements, for the constituent element which has not completed the vendor certification test normally, the vendor certification test conducting part 13 searches the vendor certification information database 50 to find whether there is a constituent element determination table 400 recording a configuration including a constituent element different from the constituent element included in the set of substitutable constituent elements, and also having received vendor certification; if the applicable table 400 exists, the vendor certification test conducting part 13 proposes the similar configuration.

Even when the vendor certification test has not normally completed for two or more constituent elements, it is only necessary to determine, for each one of these constituent elements, whether there is a constituent element determination table 400 recording different configuration including a substitutable constituent element. Further, to substitute candidate constituent elements, weights which are based on the degree of suitability of substitute or the like are given in advance, and scores of configurations each including substitutable constituent elements are calculated as a total of the weights, and thereby, the similarity determination may be performed.

In S312, if it is determined that there is a constituent element determination table 400 recording a configuration which has a similar configuration as described above and which has received vendor certification (Yes in S312), the vendor certification test conducting part 13 proposes the similar configuration to the user by displaying the similar configuration on the display screen of the output device 105 of the transaction server 30 (S313). When the vendor certification test conducting part 13 determines that there is no similar configuration (No in S312), the process flow of FIG. 3 is terminated.

In accordance with the above embodiment, it is possible to detect a change of a constituent element of the storage system 1 by the SVP 10, and perform a quick vendor certification test for the configuration in which the change has occurred by the configuration of the storage system 1 which a user possesses.

Further, when the vendor certification test has not normally been completed for part of the constituent elements, the SVP 10 searches the vendor certification information database 50 to find out whether a similar constituent element having received vendor certification is stored, and if such a constituent element exists, the constituent element is proposed to the user.

Described below are a screen which is displayed in S309 of FIG. 3 when the vendor certification test is not normally completed, and an example of a screen which is displayed if it is determined that there is a similar configuration having received vendor certification and when the similar constituent element is displayed in S313 of FIG. 3. An example of the display screen 900 is shown in FIG. 9.

Figure 9:
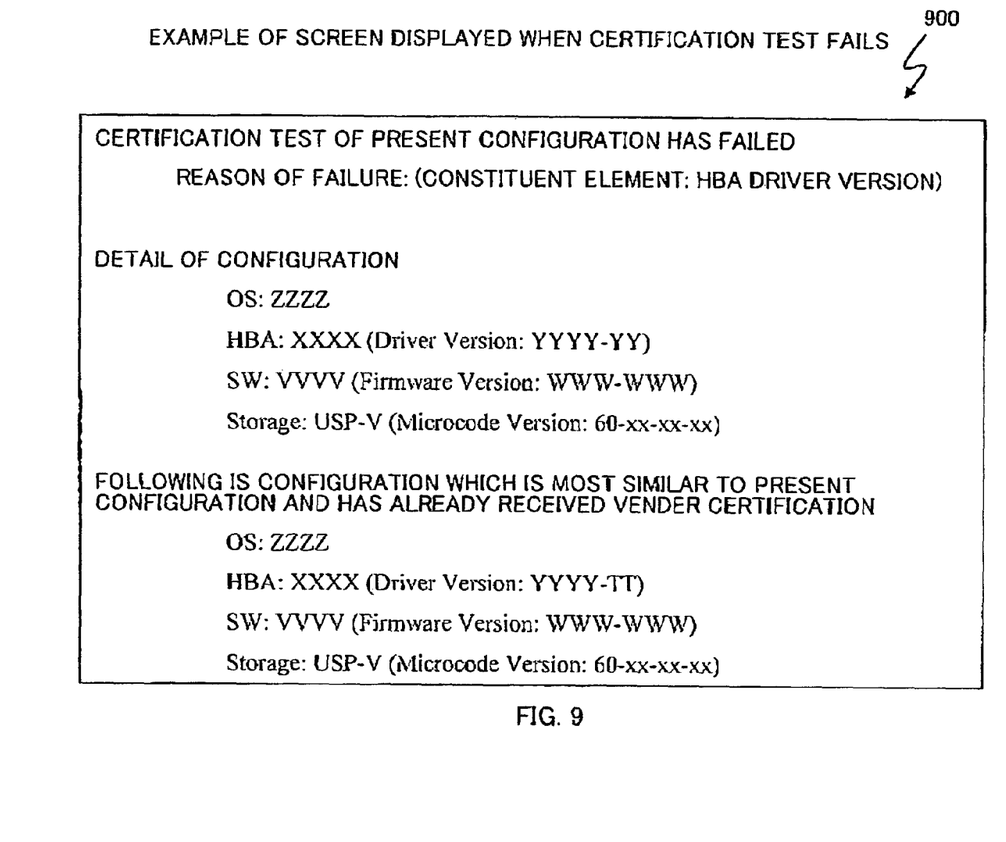
FIG. 9 is an example of a display screen to be displayed when a vendor certification test fails.

On the display screen of FIG. 9, for contents corresponding to the process of S311 of FIG. 3, the following are included: "the vendor certification test has not normally been completed" and "the cause of failure is in a test of HBA Driver Version." These display contents are generated, for example, by the vendor certification test conducting part 13, and displayed on the output device 105 of the transaction server 30 or the like, as described above.

In the example of FIG. 9, since it is determined in S312 that there is a similar constituent having received vendor certification, constituent elements of the similar configuration are displayed on a lower portion of the display screen 900. In this case, for the version of the HBA driver, substitute "YYYY-TT," corresponding to "YYYY-YY" for which the vendor certification test has not normally completed is displayed with an underline. Incidentally, the contents displayed on the display screen 900 of FIG. 9, and a layout of the screen are not limited to those of the example of FIG. 9, and these may be changed as needed.

—Contents of Process of Vendor Certification Test—

Next, contents of the vendor certification test conducting process (S305) in the process flow of FIG. 3 are described in sequence.

Figure 5:
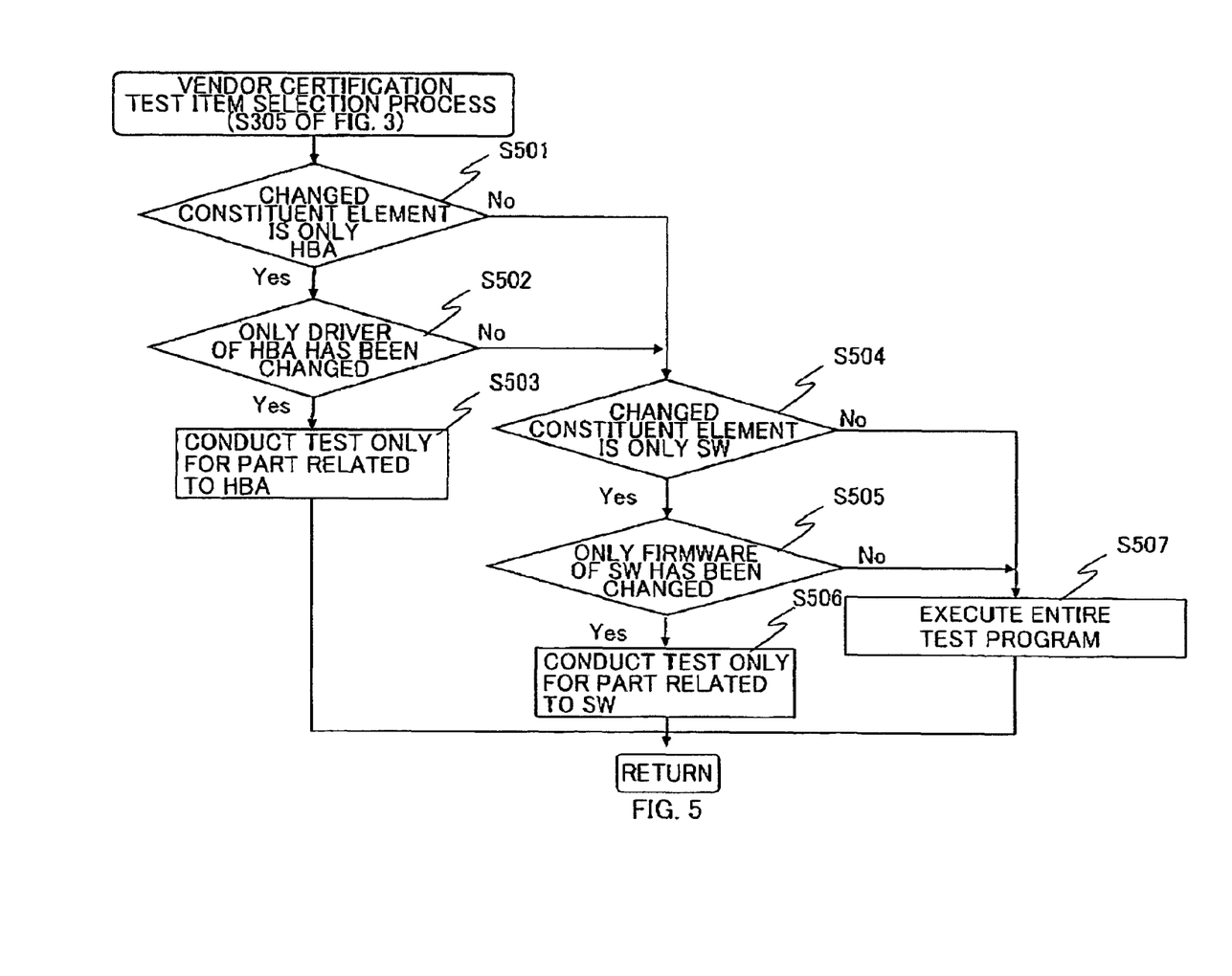
FIG. 5 is an example of a vendor certification test selection process flow to be conducted for component of the storage device 1.
Figure 6:
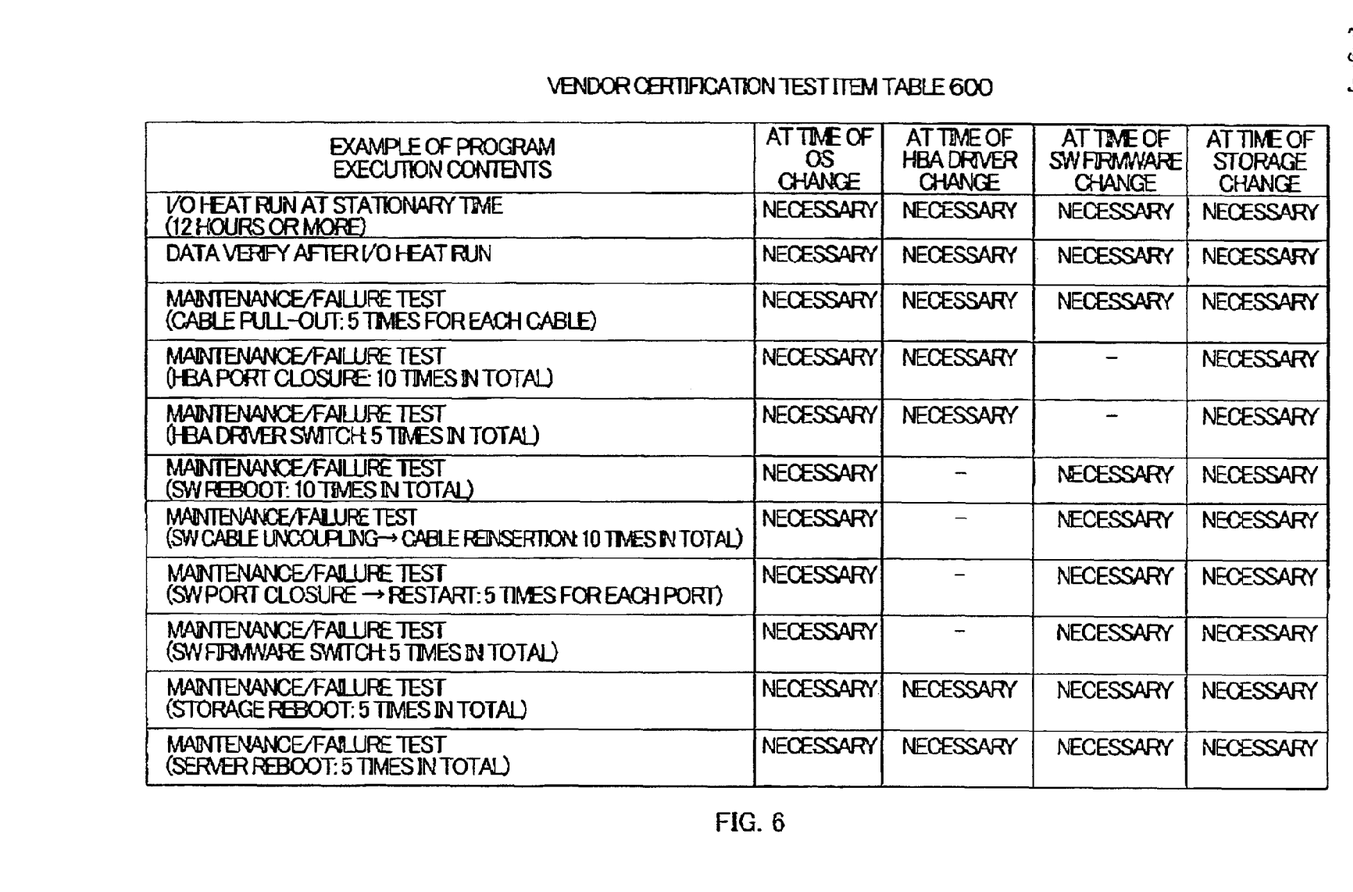
FIG. 6 is an example of a vendor certification test item table 600.

First, a process for selecting an item of the vendor certification test to be conducted for the configuration of the storage system 1 is described with reference to FIGS. 5 and 6. FIG. 5 shows an example of a process flow in which an item of the vendor certification test is selected depending on which constituent element is changed in the storage system 1 in the vendor certification test. FIG. 6 shows an example of a vendor certification test item table 600 on which vendor certification test items are listed for each constituent element.

The vendor certification test item table 600 of FIG. 6 is a table recording test items each of which needs to be conducted for receiving vendor certification when a change is made to a constituent element. The vendor certification test item table 600 is stored in the vendor certification information storage area 24 of the storage apparatus 20.

On the leftmost column of FIG. 6, vendor certification test items are recorded, and corresponding thereto, necessary/not necessary of conducting the test is recorded depending on changed constituent elements. For example, if the server OS or the storage apparatus 20 is changed, all the test items must be conducted. Meanwhile, if the HBA driver or the firmware of the switch is changed, there are some items in the vendor certification test items which are not necessary to be conducted.

In the process flow of FIG. 5, a process is performed in which vendor certification test items are selected depending on a changed constituent element based on test items of FIG. 6.

First, the configuration change detecting part 12 of the SVP 10 determines whether a changed constituent element is only the HBA 32 (S501). When detecting it is only the HBA 32 (Yes in S501), the configuration change detecting part 12 thereafter determines whether a constituent element which has been changed is only the driver of the HBA 32 (S502). When determining that only the driver of the HBA 32 has been changed (Yes in S502), the configuration change detecting part 12 gives a notice of the determination result to the vendor certification test conducting part 13, and the vendor certification test conducting part 13 performs only the test items which are necessary to be conducted if the HBA driver is changed as shown in FIG. 6 (S503).

In S501, if the configuration change detecting part 12 determines that changed constituent elements are not only the HBA 32, the configuration change detecting part 12 subsequently determines whether a changed constituent element is only the FC switch 40 (S504). When determining that it is only the FC switch 40 (Yes in S504), the configuration change detecting part 12 subsequently determines whether a changed constituent element is only the firmware of the FC switch 40 (S505). When determining that only the firmware of the FC switch 40 has been changed (Yes in S505), the configuration change detecting part 12 gives a notice of the determination result to the vendor certification test conducting part 13, and the vendor certification test conducting part 13 performs only the test items which are necessary to be conducted if the firmware of the FC switch 40 is changed as shown in FIG. 6 (S506).

When the configuration change detecting part 12 determines that the changed constituent element is not only the FC switch 40 (No in S504), or that the changed constituent element is not only the firmware of the FC switch 40 (No in S505), the configuration change detecting part 12 gives a notice of the determination result to the vendor certification test conducting part 13. Receiving the notice, the vendor certification test conducting part 13 performs all the vendor certification test items (S507).

After terminating this process flow, the process returns to S306 of FIG. 3.

According to this embodiment, the vendor certification test conducting part 13 is capable of omitting test items which is not necessary to be conducted depending on a changed constituent element, which enables the reduction of the time and cost necessary for the vendor certification test.

Figure 7:
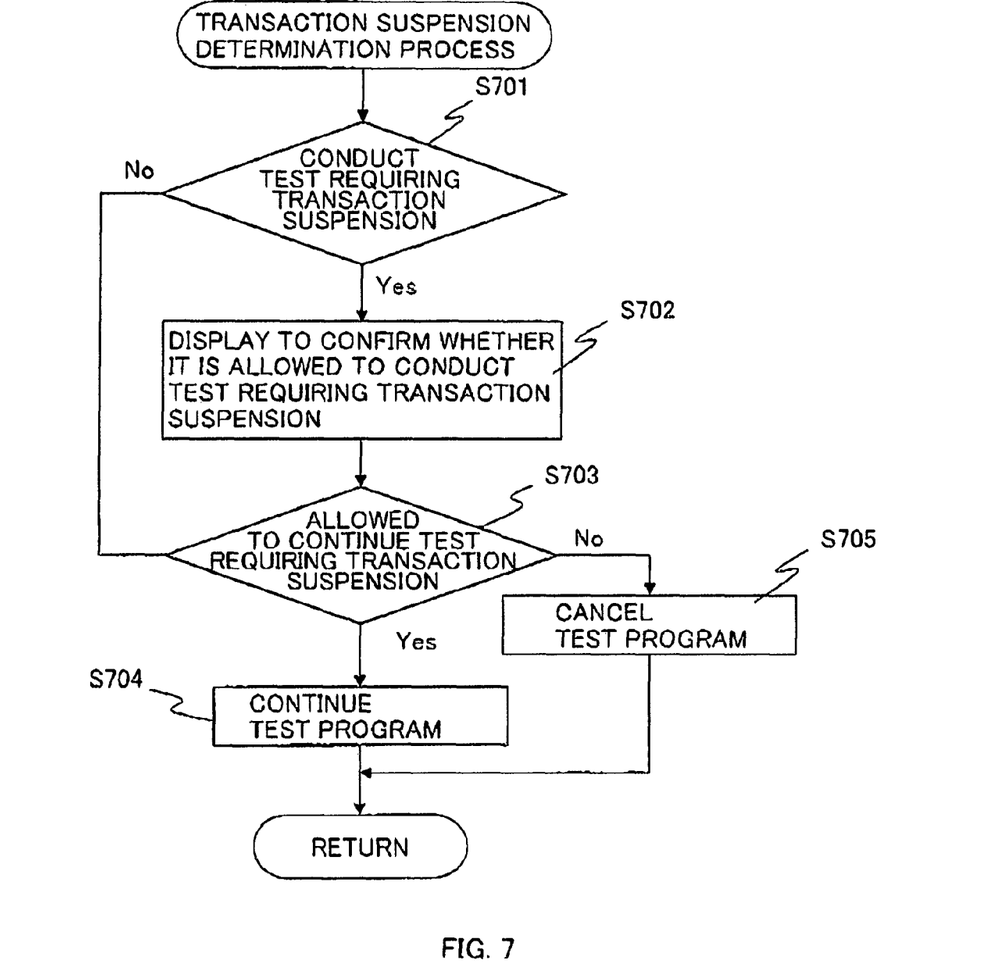
FIG. 7 is an example of a conduct/not-conduct determination process flow of vendor certification test items, which involves transaction suspension of a user.

Next, described is a process flow for determining whether to conduct a test for the vendor certification test items which can not be conducted unless transaction of the user using a storage system 1 is suspended. FIG. 7 shows an example of the conduct/not-conduct determination process flow.

Among each of the test items shown in the vendor certification test item table 600 of FIG. 6, for example, there are items for which the conducting of the vendor certification test is not possible unless the transaction of the storage system 1 including the transaction server 30 is suspended, such as I/O heat run in which an I/O operation is continuously repeated for a certain period of time between the transaction server 30 and the storage apparatus 20, and as the pulling out of a cable in a configuration without an alternative path in which two or more paths are not provided to the storage system 1, or such a test that requires power shutdown and reboot of the storage apparatus 20. Meanwhile there are items, for which the conducting of the vendor certification test is possible without suspending the transaction of the storage system 1, such as the replacement of the driver of the HBA 32 and replacement of a microprogram of the storage apparatus 20, which is performed by so-called hot-swap.

In the process flow of FIG. 7, when conducting a test item which requires suspension of transaction, i.e., a test item which can not be conducted unless the storage system 1 is shut down, a process for requesting the user to confirm the conducting of the test is achieved in advance. The process of FIG. 7 is performed in S305 of the process flow of FIG. 3, and further, when the test item selection process flow of FIG. 5 is applied, the process of FIG. 7 is performed subsequent to the process of FIG. 5.

First, the vendor certification test conducting part 13 of the SVP 10 determines (S701) whether the test item requiring transaction suspension is about to be conducted by referring to the vendor certification test item table 600 of FIG. 6.

When determining that the test item requiring transaction suspension is about to be conducted (Yes in S701), the vendor certification test conducting part 13 performs a process for confirming the user whether it is allowed to conduct the test item requiring the suspension of transaction (S702). More specifically, the vendor certification test conducting part 13 displays a screen including a statement indicating "test item requiring suspension of transaction is to be conducted" on the output device 105 such as the monitor of the transaction server 30.

Next, the vendor certification test conducting part 13 determines whether the user has determined to allow the conducting of the test item requiring the suspension of transaction (S703).

More specifically, for example, a button is provided to the screen including the statement indicating "test item requiring suspension of transaction is to be conducted," so that the user can input the determination of whether to conduct the test item. The vendor certification test conducting part 13 acquires information inputted through an operation of the button by the user, and determines whether to conduct the test.

When it is determined that the user has determined to conduct the test item requiring suspension of transaction (Yes in S703), the vendor certification test conducting part 13 continues the vendor certification test (S704).

When it is determined that the user has determined not to conduct the test item requiring suspension of transaction (No in S703), the vendor certification test conducting part 13 cancels the vendor certification test (S705). After terminating this process flow, the process returns to S306 of FIG. 3.

In accordance with the above embodiment, the user can consider the progress of his/her transaction or the like, and can suitably determine whether to conduct or postpone the test of the vendor certification test item requiring suspension of transaction, i.e., the shutdown of the storage system 1.

Incidentally, if determining whether a test item is one requiring suspension of transaction, there are some cases where a test item requiring suspension of transaction can be exceptionally conducted since a constituent element (e.g., FC switch 40) is configured with redundancy in a configuration of a storage system 1 being a test conducting target. Accordingly, in the determining process, such specific condition of the storage system 1 may be considered.

Figure 8:
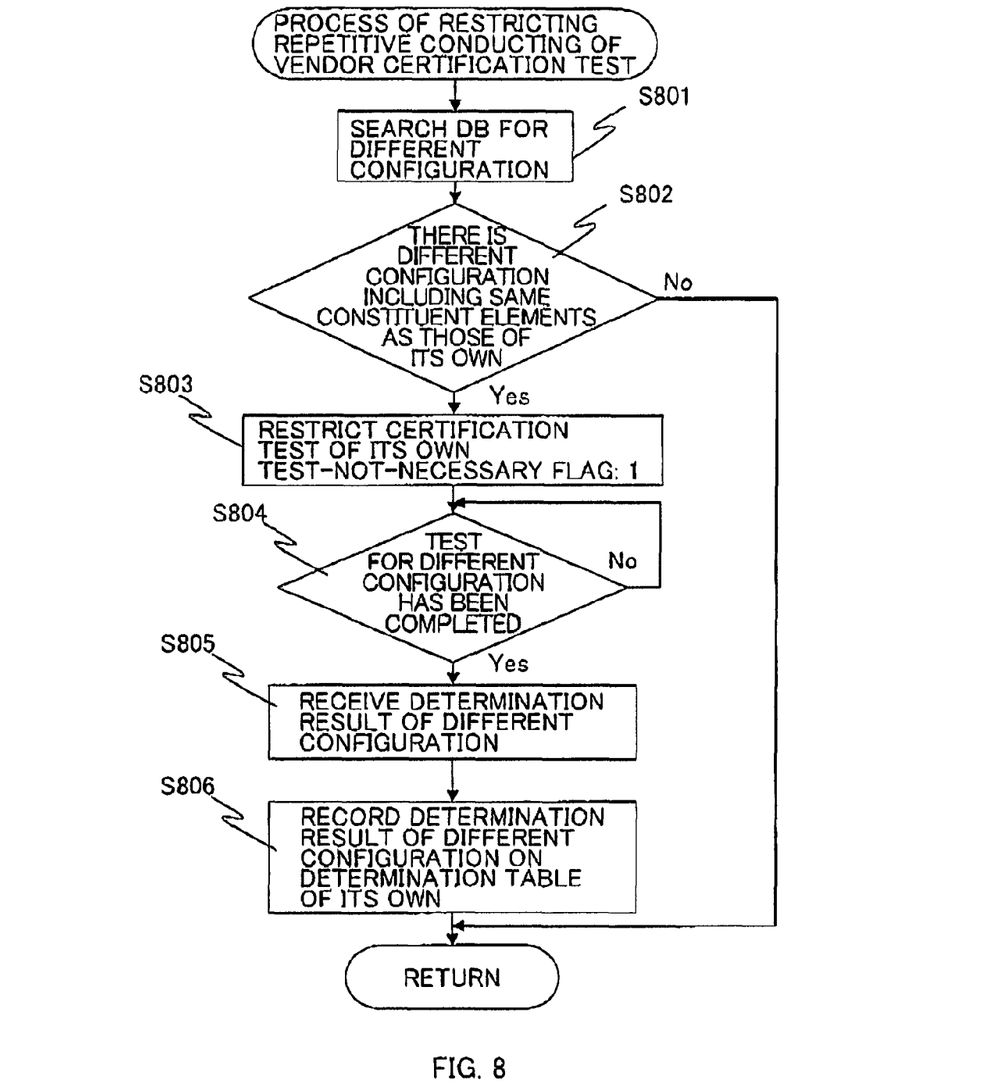
FIG. 8 is an example of an omit/not-omit determination process flow of vendor certification test.

Next, described is a vendor certification test omit/not-omit determination process flow in the case where constituent element determination tables 400 related to a plurality of storage systems 1 exist in the vendor certification information database 50. FIG. 8 shows an example of the omit/not-omit determination process flow.

The process flow of FIG. 8 is as follows. In the case where a plurality of storage systems 1 are coupled to the vendor certification information database 50, the vendor certification test is conducted only for a first storage system 1 among two or more storage systems 1 including the same constituent elements as each other, if common constituent elements have changed. Here, the conducting of the tests for the other storage systems 1 are restricted so as to prevent the vendor certification test from being repeatedly conducted for the same configurations.

When applying this process flow, this process flow is inserted immediately before S305 of the process flow of FIG. 3.

First, when receiving a notice, from the configuration change detecting part 12, indicating that a configuration change has been detected for a storage system 1, the vendor certification test conducting part 13 of the SVP 10 of the storage apparatus 20 coupled to this storage system 1 searches for the constituent element determination table 400 of a different storage system 1 stored in the vendor certification information database 50 (S801). The vendor certification test conducting part 13 determines whether the different constituent element determination table 400 has the same constituent elements, including a changed constituent element, as the constituent elements of its own (S802). When the vendor certification test conducting part 13 determines that there is no such different constituent element determination table 400 (No in S802), the process flow is terminated.

When it is determined that there is a different constituent element determination table 400 having the same constituent elements (Yes in S802), including the changed constituent element, a determination result recorded on the different constituent element determination table 400 can be used. Accordingly, the conducting of the vendor certification test of its own is restricted, and the test-not-necessary flag 410 of a constituent element determination table 400 of its own is set to "1" (S803).

Next, the vendor certification test conducting part 13 determines whether the vendor certification test for a storage system 1 corresponding to the different constituent element determination table 400 has been completed, and if determining that the vendor certification test has been completed (Yes in S804), the vendor certification test conducting part 13 acquires a determination result recorded on the different constituent element determination table 400 (S805), and records the determination result on the constituent element determination table 400 of its own (S806).

Meanwhile, if the vendor certification test conducting part 13 determines that the vendor certification test for the storage system 1 corresponding to the different constituent element determination table 400 has not been completed (No in S804), the process waits a completion.

In this case, a the vendor certification test conducting part 13 belonging to the storage system 1 corresponding to the different constituent element determination table 400 searches the vendor certification information database 50 at the time of completion of the test, and gives a notice indicating the completion of the test to the vendor certification test conducting part 13 involved in this process flow, by referring to the test-not-necessary flag 410 recorded above.

The vendor certification test conducting part 13 having received the notice indicating the completion of the test acquires a determination result recorded on the different constituent element determination table 400 as described above (S805), and records the determination result on the constituent element determination table 400 of its own (S806).

According to the embodiment, for two or more storage systems 1 including the same constituent elements as each other, the vendor certification test is prevented from being repeatedly conducted, so that the time and cost necessary for the vendor certification test is reduced. In addition, an effect is produced in which suspension of transaction due to the conducting of the vendor certification test does not occur for a user who has been able to avoid the repetitive conducting of the vendor certification test, so that the operation efficiency of a storage system 1 is enhanced.

The invention claimed is:

1. An information processing apparatus validating a configuration of a storage system having a server device, a storage device providing the server device with a storage area, and a relay device coupling the storage device and the server device, comprising:
   a configuration information storing part acquiring and storing constituent element information pieces from the server device, the storage device, and the relay device, the constituent element information pieces each being information on a constituent element that is a test target of a vendor certification test to be conducted in order to obtain a certification for the storage system from a vendor of software installed in the server device;
   a configuration change detecting part comparing the stored constituent element information pieces that are stored in the configuration information storing part with the constituent element information piece that is acquired from the storage system by the configuration information storing part, so as to determine whether there is a change in the acquired constituent element information piece, and, if determining that there is a change in the acquired constituent element information piece, the configuration change detecting part comparing the acquired constituent element information piece determined as being changed with certified constituent element information pieces that are stored in a storing device coupled to the information processing apparatus and having received the vendor certification, so as to determine whether the storing device includes any certified constituent element information piece which matches the acquired constituent element information piece determined as being changed;
   a vendor certification test conducting part conducting the vendor certification test targeted for the storage system having the acquired constituent element information piece determined as being changed, if the configuration change detecting part determines that no matching constituent element information piece is included; and
   a data storing part storing, in the storing device, a result of the vendor certification test conducted by the vendor certification test conducting part.

2. The information processing apparatus according to claim 1, wherein the constituent element information pieces include any one selected from a group of a type of software installed in the server device, a version of the software, a model number of an HBA provided to the server device, a version of software operating on the HBA, a model number of the relay device, a version of software operating on the relay device, a model number of the storage device, and a version of software operating on the information processing apparatus.

3. The information processing apparatus according to claim 1, wherein the storing device is coupled to a plurality of the storage systems, and stores therein constituent element information pieces of the respective storage systems, and
   the information processing apparatus is capable of referring to the constituent element information pieces of the respective storage systems stored in the storing device.

4. The information processing apparatus according to claim 1, wherein if the configuration change detecting part determines that a matching constituent element information piece is included, the vendor certification test conducting part acquires a test result of the matching constituent element information piece from the storing device, and then stores the test result in the storing device as a test result for the storage system, instead of conducting the vendor certification test targeted for the storage system.

5. The information processing apparatus according to claim 1, wherein the vendor certification test conducting part conducts the vendor certification test with respect to a predetermined test item targeted for the constituent element determined to have a change by the configuration change detecting part.

6. The information processing apparatus according to claim 1, wherein, in the vendor certification test, before conducting a test item requesting discontinue of a transaction in process in the storage system, the vendor certification test conducting part generates screen data including an inquiry as to whether the conducting of the test item is allowed, and then displays the screen data via an output device provided to the storage system.

7. The information processing apparatus according to claim 1, wherein the information processing apparatus is coupled to a computer which the vender possesses, and
   if determining that the vendor certification test conducted for the storage system as a target has normally been completed, the vendor certification test conducting part transmits, to the computer possessed by the vendor, information indicating that the vendor certification test has normally been completed, in order to obtain the vendor certification for the storage system from the vendor.

8. The information processing apparatus according to claim 1, wherein, before conducting the vendor certification test, the vendor certification test conducting part searches the storing device to determine whether there is a different storage system being different from the storage system to which the vendor certification test conducting part belongs and having a constituent element information piece which matches the constituent element information piece of the storage system to which the vendor certification test conducting part belongs, and if determining that there is the different storage system, the vendor certification test conducting part suspends a start of the vendor certification test.

9. The information processing apparatus according to claim 1, wherein if the vendor certification test conducting part determines that there is a test item not completed normally among test items of the vendor certification test, the vendor certification test conducting part searches the constituent element information pieces stored in the storing device, acquires a constituent element information piece being similar to a constituent element information piece of the storage system and having received the vendor certification, and then displays a screen including the similar constituent element information piece via an output device provided to the storage system.

10. A method of operating an information processing apparatus validating a configuration of a storage system having a server device, a storage device providing the server device with a storage area, and a relay device coupling the storage device and the server device, comprising the steps of:

by using a configuration information storing part of the information processing apparatus, acquiring and storing constituent element information pieces from the server device, the storage device, and the relay device, the constituent element information pieces each being information on a constituent element that is set as a test target of a vendor certification test to be conducted in order to obtain a certification for the storage device from a vendor of software installed in the server device;

by using a configuration change detecting part of the information processing apparatus, comparing the stored constituent element information pieces that are stored in the configuration information storing part with the constituent element information piece that is acquired from the storage system by the configuration information storing part, so as to determine whether there is a change in the acquired constituent element information piece, and, if determining that there is a change in the acquired constituent element information piece, the configuration change detecting part comparing the acquired constituent element information piece determined as being changed with certified constituent element information pieces that are stored in a storing device coupled to the information processing apparatus and having received the vendor certification, so as to determine whether the storing device includes any certified constituent element information piece which matches the acquired constituent element information piece determined as being changed;

by using a vendor certification test conducting part of the information processing apparatus, conducting the vendor certification test targeted for the storage system having the acquired constituent element information piece determined as being changed, if the configuration change detecting part determines that no matching constituent element information piece is included; and by using a data storage part of the information processing apparatus, storing, in the storing device, a result of the vendor certification test conducted by the vendor certification test conducting part.

* * * * *